United States Patent [19]
Kobak et al.

[11] Patent Number: 5,945,160
[45] Date of Patent: *Aug. 31, 1999

[54] FLUID DISPENSING SYSTEM

[75] Inventors: Roger Leo Kobak, Castlerock; Gary L. Yount, Morrison; James S. Stirbis, Littleton; William W. Weil, Golden, all of Colo.

[73] Assignee: Preferred Machining Corporation, Englewood, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/899,715

[22] Filed: Jul. 24, 1997

Related U.S. Application Data

[62] Division of application No. 08/654,624, May 29, 1996, Pat. No. 5,749,969, which is a continuation of application No. 08/322,791, Oct. 13, 1994, abandoned, which is a continuation of application No. 07/977,259, Nov. 16, 1992, abandoned, which is a continuation of application No. 07/666,656, Mar. 8, 1991, abandoned.

[51] Int. Cl.$^6$ .............. B05D 7/22; B05D 1/02; B05D 1/30
[52] U.S. Cl. ........... 427/233; 427/425; 251/129.15; 239/63; 239/541; 239/581.2; 239/583
[58] Field of Search .................. 427/233, 425; 118/668, 679, 681, 684, 710; 239/63, 99, 541, 581.2, 583, 585.5; 251/129.01, 129.09, 129.1, 129.15, 129.2, 129.21, 205, 319, 903

[56] References Cited

U.S. PATENT DOCUMENTS

| | | | |
|---|---|---|---|
| 2,189,783 | 2/1940 | Eberhart | 91/45 |
| 2,587,538 | 2/1952 | Seaman | 137/139 |
| 2,732,315 | 1/1956 | Birkland | 117/43 |
| 3,001,506 | 9/1961 | Ford | 118/318 |
| 3,412,971 | 11/1968 | McDivitt | 251/137 |
| 3,521,598 | 7/1970 | Straw | 118/2 |

(List continued on next page.)

FOREIGN PATENT DOCUMENTS 63-73175  5/1988  Japan .

OTHER PUBLICATIONS

Lucas Ledex, Inc. Catalog "Series 50–L Stepping Solenoids", pp. SS–1 to SS–6 (author unknown). No date available.

Lucas Ledex, Inc. Catalog "Low Profile Solenoids–Push or Pull", pp. LP–1 to LP–4 (author unknown). No date available.

*Primary Examiner*—Shrive Beck
*Assistant Examiner*—Michael Barr
*Attorney, Agent, or Firm*—Klaas, Law, O'Meara & Malkin, P.C.; Michael A. Goodwin, Esq.; William P. O'Meara, Esq.

[57] ABSTRACT

A nozzle actuating and adjustment system for applying sealant to a can lid member comprising a nozzle which has a sealant dispensing opening, a needle valve means, a needle valve seat surface and a sealant flow passage for enabling flow of sealant material onto the lid member. The needle valve is selectively axially movable between an open sealant applying position and a closed non-flow position relative to the needle valve seat surface. A spring means is operatively associated with the needle valve means to normally hold the needle valve means in the closed lowered position. A needle valve actuator solenoid is operatively connected to the needle valve for selectively causing axial upward movement of the needle valve from the closed position to the open position by a predetermined axial distance to provide a predetermined sealant flow gap in the nozzle means to dispense a predetermined amount of sealant material during a predetermined dispensing time period. A flow gap adjustment solenoid is operatively connected to the needle valve actuator solenoid for selectively changing the amount of axial movement of the needle valve caused by the actuator solenoid so as to selectively vary the sealant flow gap and the amount of sealant material dispensed during a predetermined dispensing time.

5 Claims, 21 Drawing Sheets

5,945,160
Page 2

U.S. PATENT DOCUMENTS

| | | | |
|---|---|---|---|
| 3,612,479 | 10/1971 | Smith, Jr. | 251/176 |
| 3,761,053 | 9/1973 | Bedo et al. | 251/88 |
| 3,780,981 | 12/1973 | Horak et al. | 251/144 |
| 3,852,095 | 12/1974 | Hogstrom | 117/43 |
| 4,262,629 | 4/1981 | McConnellogue et al. | 118/668 |
| 4,295,573 | 10/1981 | Terry et al. | 215/348 |
| 4,342,443 | 8/1982 | Wakeman | 251/137 |
| 4,437,488 | 3/1984 | Taggart et al. | 137/334 |
| 4,498,415 | 2/1985 | Tsuchiya et al. | 118/712 |
| 4,546,955 | 10/1985 | Beyer et al. | 251/129.15 |
| 4,566,416 | 1/1986 | Berchtold | 123/458 |
| 4,840,138 | 6/1989 | Stirbis | 118/694 |
| 4,852,773 | 8/1989 | Standlick et al. | 222/504 |
| 4,884,720 | 12/1989 | Whigham et al. | 222/54 |
| 4,958,769 | 9/1990 | Schowiak | 239/114 |
| 5,215,587 | 6/1993 | McConnellogue et al. | 118/699 |
| 5,419,492 | 5/1995 | Gant et al. | 239/88 |

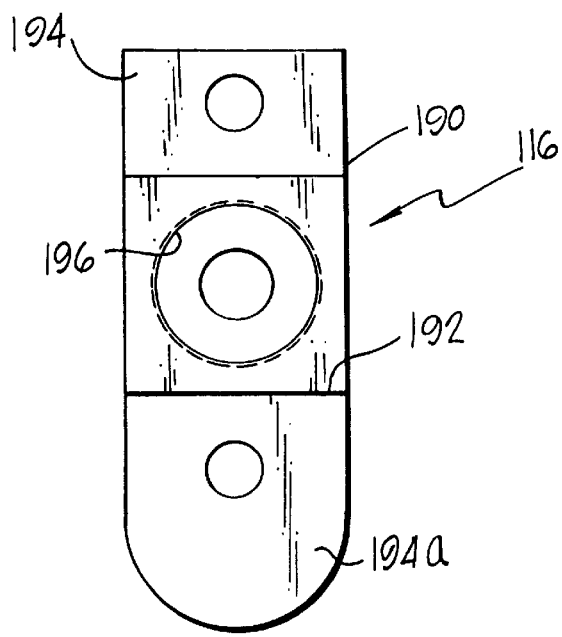
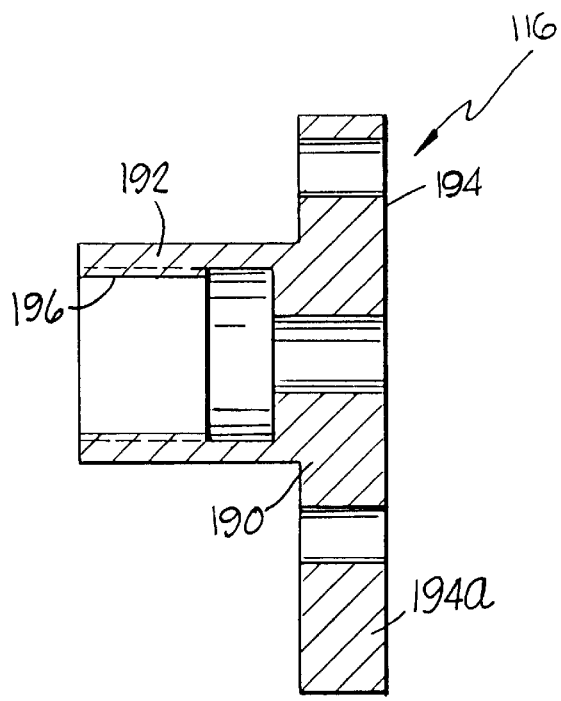
FIG 13　　　　　　　　　　FIG.14
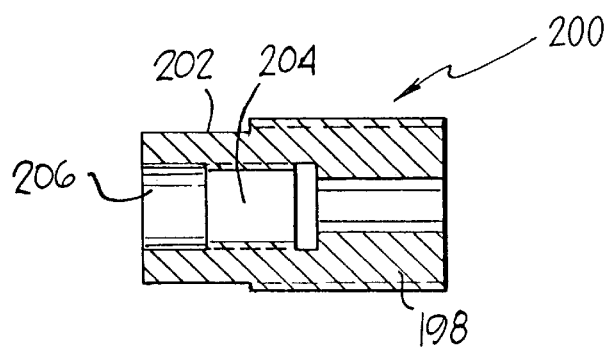
FIG.14A

FLUID DISPENSING SYSTEM

This application is a division of application Ser. No. 08/654,624, filed May 29, 1996 U.S. Pat. No. 5,749,969 which is a continuation of application Ser. No. 08/322,791, filed Oct. 13, 1994 (abandoned) which is a continuation of application Ser. No. 07/977,259, filed Nov. 16, 1992 (abandoned) which is a continuation of application Ser. No. 07/666,656, filed Mar. 8, 1991 (abandoned).

BACKGROUND

This invention relates generally to a system for dispensing fluids, and more particularly to a sealant delivery system and apparatus for application of a sealant compound material to container lids and closures of the type disclosed in U.S. Pat. Nos. 4,262,629 and 4,840,138, the disclosures of which are incorporated herein by reference.

In general, the apparatus of U.S. Pat. Nos. 4,262,629 and 4,840,138 comprises a rotary can lid feed mechanism having a series of pockets which are advanced through a downstacker area to laterally shift each lowermost lid in succession of the stack of lids along an arcuate guide path into each of a series of shallow recesses formed in a rotary chuck table. The rotary chuck table has a series of lift chucks disposed in normally lowered position beneath the recesses, and a rotary drive is operative to synchronously rotate the table and lift chucks at a predetermined rate of speed. A cam member located in the path of travel of the lift chucks is operative to advance each lift chuck in succession when it is received at a first station between a normally lowered position and a raised position through a distance corresponding to two stations, after which the lid is lowered as it is advanced to a third station and discharged into a collection area. The empty recess then continues through a distance corresponding to three more stations before it picks up another can lid. An upper sealant gun assembly includes a spring-loaded chuck aligned with each recess so as to be engageable with each lid as it is raised by the lift chuck to activate an associated sealant gun in response to such engagement. The sealant is discharged from the gun as the can lid is caused to rotate about its own axis by rotation of the lift chuck through the first two stations so as to uniformly deposit the lining material into the groove of each can lid in succession. Again, following application of the sealant, the can lid is lowered by the lift chuck, then disengaged so as to permit the can lid to be discharged from the table preferably by the rotary speed of rotation of the table into a discharge or collection area. Feed interrupt mechanism is provided for interrupting advancement of the can lids from the downstacker area in passing in the event of misalignment of a lid; also, an interrupt mechanism is provided in association with the sealant gun to interrupt delivery of sealant in the event that the can lid is not properly aligned with respect to a recess on the chuck table. Preferably, both interrupt mechanisms are controlled by a common sensor in the rotary feed mechanism; however, a separate sensor is provided on the upper chuck assembly to interrupt supply of sealant. Apparatus of this type has been successfully employed with sealant material made from a non-abrasive, non-corrosive solvent base compound which does not present any significant problems in the sealant delivery system.

The apparatus of U.S. Pat. No. 4,840,138 provides a sealant dispensing system for use with a conventional rotary-type sealant-applying machine wherein a plurality of circumferentially spaced sealant supply hose means connect a sealant supply means to a plurality of circumferentially spaced sealant dispensing head means which rotate about a central axis of rotation. The sealant supply means is located in coaxial relationship with the central axis of rotation and rotates thereabout and comprises an elongated vertical rotatable supply chamber means in which a supply of sealant is maintained under pressure by a supply of compressed air for delivery to the sealant dispensing head means through the supply hose means.

A spindle means is attached to the supply chamber means for rotation therewith and extends into a non-rotatable support housing with bearing means mounted therebetween. The support housing means and the spindle means have coaxial aligned central passages which are coaxial with the central axis of rotation. Sealing means are mounted between the spindle means and the support housing means to prevent escape of air from the air passage means. Sealant is delivered to the supply chamber means through a non-rotatable central tubular passage means mounted in the housing and spindle passage means in coaxial alignment with the central axis of rotation. Air is delivered to the supply chamber means through an annular passage means circumjacent the tubular passage means. Electrical sensing means are provided to monitor the amount of sealant in the supply chamber means and to cause additional amounts of sealant to be automatically delivered to the supply chamber when a lower chamber level of sealant is detected and to terminate delivery when an upper maximum sealant level is reached. The sensing means are activated by contact with the conductive water-base sealant compound. The construction and arrangement is such that the sealant does not contact any part of the spindle means nor the support housing means nor the bearing and sealing means associated therewith.

The nozzle apparatus of U.S. Pat. Nos. 4,262,629 and 4,840,138 was actuated between open and closed positions by a mechanical linkage and the size of the dispensing opening was adjusted by a mechanical linkage. Some attempts have been made to provide electric operated pneumatic and/or hydraulic actuation systems.

SUMMARY OF THE INVENTION

A primary object of the present invention is to provide a new and improved nozzle actuating and adjustment system which is operable solely by electrically operable actuator devices.

Another object is to provide a new and improved manually-operable mechanical adjustment system for selectively manually adjusting the location of the nozzle assembly relative to the lid members.

Another object is to provide a closed nozzle actuating and adjustment system to prevent accidental electrical explosion of vapors produced from sealant material.

Another object is to reduce wear and cost of construction and maintenance of the apparatus.

The present invention provides a sealant applying machine for applying sealant to can lid members comprising a plurality of circumferential spaced sealant applying stations whereat sealant material is applied to a lid member and a rotatable carriage means for supporting and carrying the stations around the machine. Each station comprises a lid holding means for holding and rotating a lid member during application of sealant material to the lid member; a sealant dispensing means mounted adjacent the lid holding means for applying sealant material to the lid member; and mounting means for holding the sealant dispensing means in fixed, non-movable relationship to the lid holding means during application of sealant material to the lid member. Each sealant dispenser comprises an elongated housing means for supporting the components of the sealant dispensing means and having a lower housing portion, an upper housing portion and an intermediate housing portion. A nozzle means on the lower housing portion has a sealant dispensing opening, a needle valve seat surface and a sealant flow passage for enabling flow of sealant material onto the lid member. A needle valve is axially slidably movably mounted in the lower housing portion and is selectively axially movable between an open sealant applying position and a closed non-flow position relative to the needle valve seat surface. A spring is mounted in the lower housing portion and is operatively associated with the needle valve means to normally hold the needle valve means in the closed lowered position. A needle valve actuator solenoid means is mounted in the intermediate housing portion and is operatively connected to the needle valve for selectively causing axial upward movement of the needle valve from the closed position to the open position by a predetermined axial distance to provide a predetermined sealant flow gap in the nozzle to dispense a predetermined amount of sealant material during a predetermined dispensing time period. A flow gap adjustment solenoid is mounted in the upper housing portion and is operatively connected to the needle valve actuator solenoid for selectively changing the amount of axial movement of the needle valve caused by the actuator solenoid so as to selectively vary the sealant flow gap and the amount of sealant material dispensed during a predetermined dispensing time.

The present invention also includes a needle valve actuator solenoid comprising a low voltage direct current operated push-pull-type solenoid device having an armature shaft portion which is axially displaceable relative to a coil portion mounted in a solenoid housing portion.

The flow gap adjustment solenoid comprises at least one low voltage direct current actuated rotational stepping-type solenoid device having at least one rotatable shaft portion which is reversely rotatable to cause variation of the amount of axial displacement of the needle valve actuator solenoid means. A solenoid coupling between the needle valve actuator solenoid and the flow gap adjustment solenoid varies the amount of axial displacement of the needle valve actuator solenoid. The solenoid coupling comprises a threaded upper end shaft portion on the actuating solenoid shaft and a threaded lower end shaft portion on the adjustment solenoid shaft. At least one threaded coupling member is connected to the upper end shaft portion and the lower end shaft portion. Rotation of the lower end shaft portion of the adjustment solenoid causes rotation and axial displacement of the upper end shaft portion of the actuator solenoid.

BRIEF DESCRIPTION OF DRAWING

An illustrative and presently preferred embodiment of the invention is shown in the accompanying drawing in which:

FIG. 13 is an end view of the actuating solenoid mounting plate and adjustable solenoid coupling member;

FIG. 14 is a cross-sectional side elevational view of the apparatus shown in FIG. 13;

FIG. 14A is a cross-sectional view of the threaded nut coupling member;

FIG. 15B is a lower end view of the upper housing portion;

DETAILED DESCRIPTION

Figure 1:
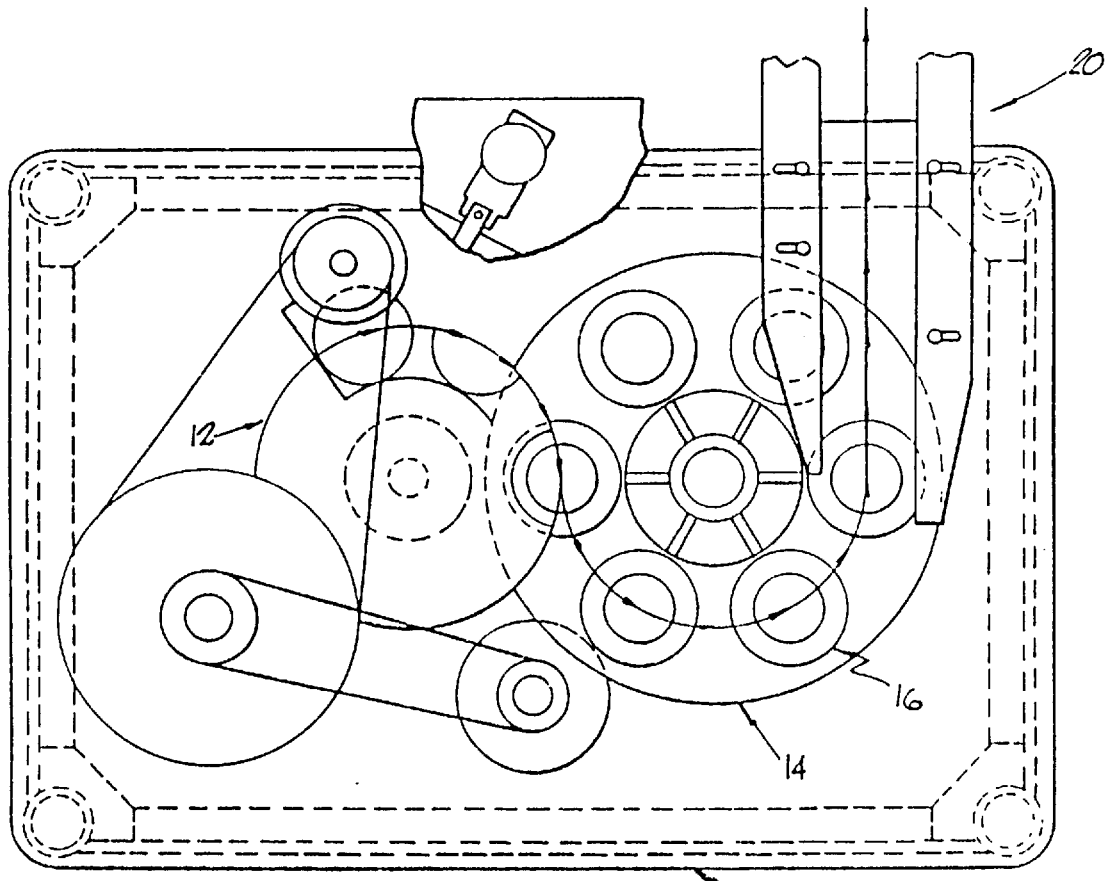
FIG. 1 is a plan view of the prior art apparatus.
Figure 2:
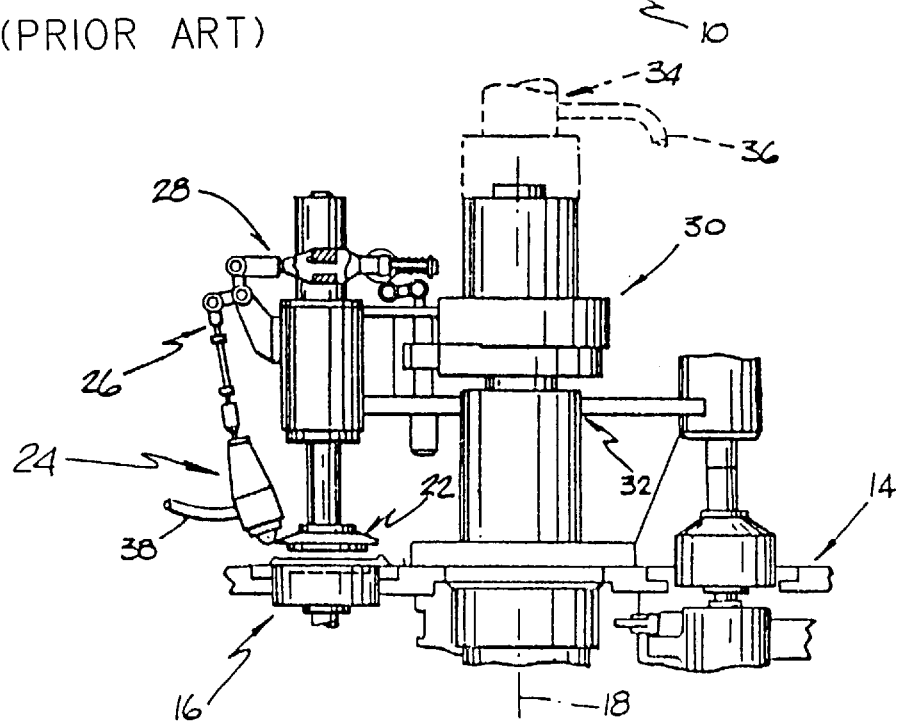
FIG. 2 is a partial enlarged side elevational view of the apparatus of FIG. 1.

In general, FIGS. 1 & 2 show a conventional can lid sealant applying machine 10 which comprises a rotatable star wheel feed means 12 for transferring can lids to a rotatable support wheel means 14 for supporting a plurality of circumferentially spaced lid support means 16 for rotation about a central axis of rotation 18 to a discharge track means 20 for removal of can lids after sealant has been applied thereto.

FIG. 2 shows the conventional sealant applying means which comprises a plurality of circumferential spaced lid holding means 22 for holding the lids on support means 16 and associated sealant applying nozzle means 24 for applying sealant to the lids during rotation of the lid support means 16. Each sealant applying nozzle means 24 has a linkage means 26 for controlling position of and supply of sealant to sealant applying nozzle means 24. The sealant applying nozzle means 24 and associated means are mounted on rotatable bracket means and hub means 30, 32 for rotation about central axis 18. A sealant supply chamber means 34 suitably mounted on bracket hub means 30, 32 is connected to each sealant applying nozzle means 24 through suitable supply hose means 36, 38.

Figure 3:
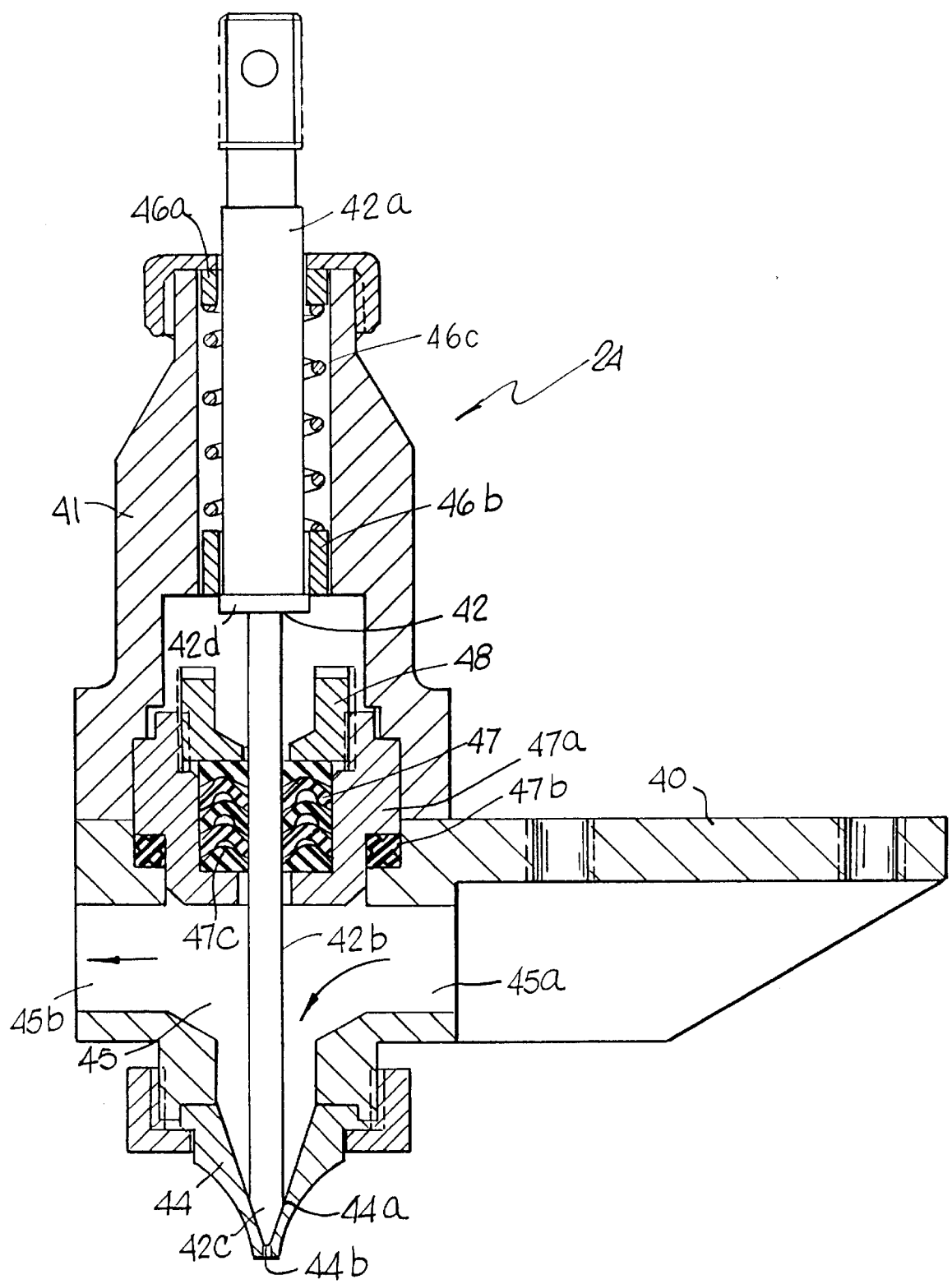
FIG. 3 is an enlarged cross-sectional view of a prior art mechanical nozzle actuation and adjustment assembly.

FIG. 3 shows a conventional mechanically actuated and adjusted nozzle means 24 which comprises a mounting plate member 40, a support housing member 41 and a cylindrical needle member 42 having a relatively large diameter upper end portion 42a, a relatively small diameter lower portion 42b with a conical end portion 42c and a connecting flange portion 42d. A nozzle end member 44 has a conical needle seat 44a above a cylindrical dispensing passage 44b. A sealant holding chamber 45 has a sealant inlet passage 45a and an outlet passage 45b suitably connected to a hose member (not shown) in a solvent-based sealant recirculation system or plugged by a suitable plug member (not shown) in a water-based sealant system. Needle member 42 is reciprocably mounted in bearing members 46a, 46b for movement between a lowermost closed-seated position and a variably adjustable raised dispensing position (not shown). Needle member 42 is normally held in the closed-seated position by a compression spring 46c mounted between bearing members 46a, 46b and operable against needle flange 42d through movable bearing member 46b. Lower needle end portion 42b extends through a packing-sealing assembly 47 to prevent escape of sealant and vapors from the sealant chamber. The assembly comprises a cup member 47a, a sealing ring member 47b and a plurality of packing rings 47c. An adjustment nut 48 is threadably mounted on cup member 47a.

Figure 4:
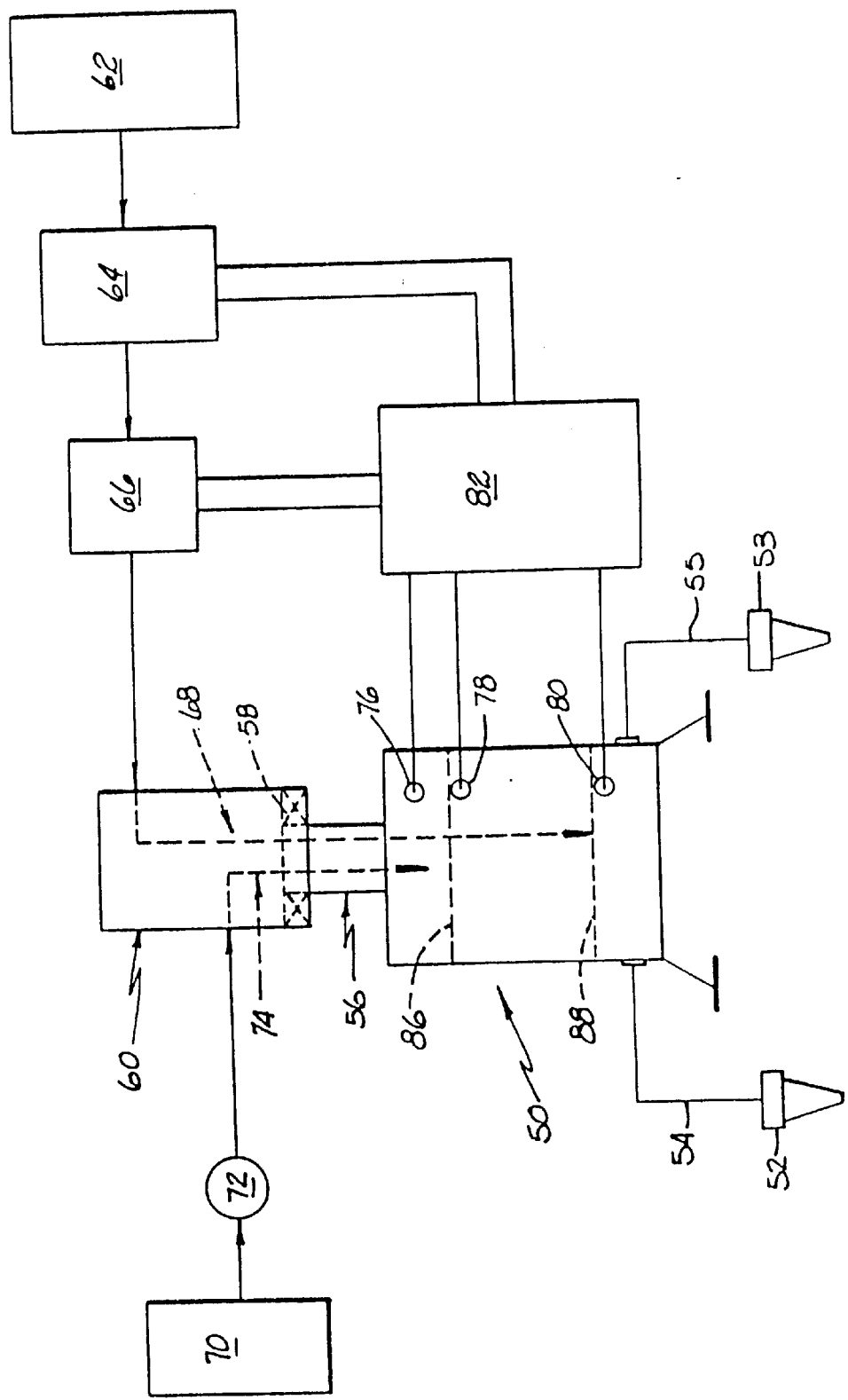
FIG. 4 is a schematic side view of the prior art fluid dispensing system.

FIG. 4 shows the sealant delivery system of U.S. Pat. No. 4,840,138 which comprises a rotatable sealant supply chamber means 50 for holding a supply of sealant for delivery to one or more conventional dispensing head means 52, 53 through conventional supply hose means 54, 55. A spindle means 56 and conventional bearing means 58 enable rotation of supply chamber means 50 relative to a conventional non-rotatable support housing means 60. Sealant is periodically supplied to supply chamber means 50 from a large-size supply container means 62 through a conventional pump means 64, a conventional solenoid valve means 66 and supply tube means 68 mounted in and extending through support housing means 60 and spindle means 56 into supply chamber means 50. Pressurized air is continuously supplied to sealant supply chamber means 50 from a conventional air supply source 70 through a conventional pressure regulator means 72 and supply passage means 74 in and extending through spindle means 56 and support housing means 60 to chamber means 50. Three level sensor means 76, 78, 80 are mounted in sealant supply chamber means 50 and connected to a conventional electrical control means 82 which controls pump means 64 and solenoid valve means 66 to maintain a supply of sealant in the chamber means 50 between a maximum level 86 and a minimum level 88. This system may be used with the present invention when a water-based sealant material is being applied.

Figure 5A:
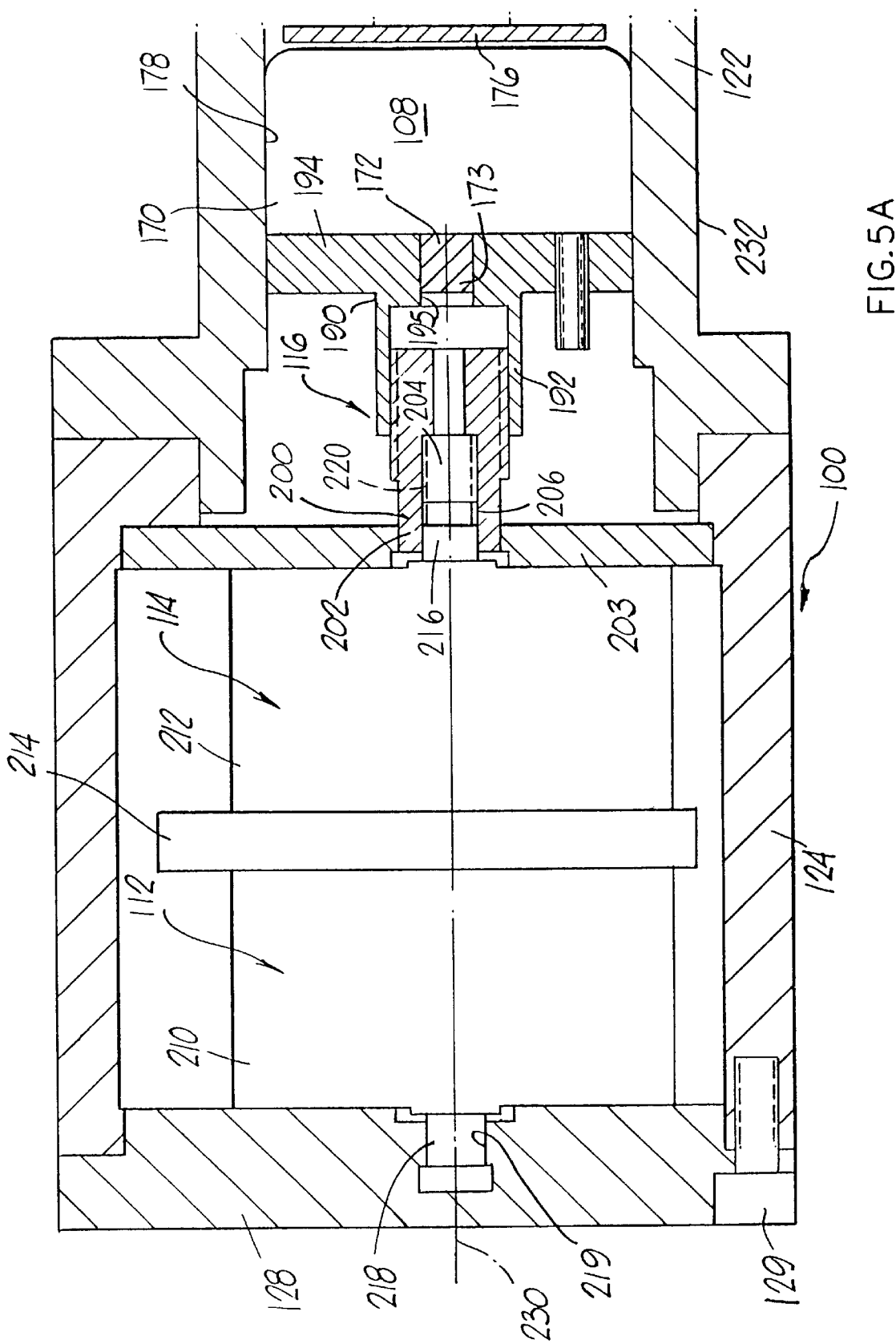
FIGS. 5A and 5B are an enlarged cross-sectional view of the automatic electronic nozzle actuating and adjustment system of the present invention.
Figure 5B:
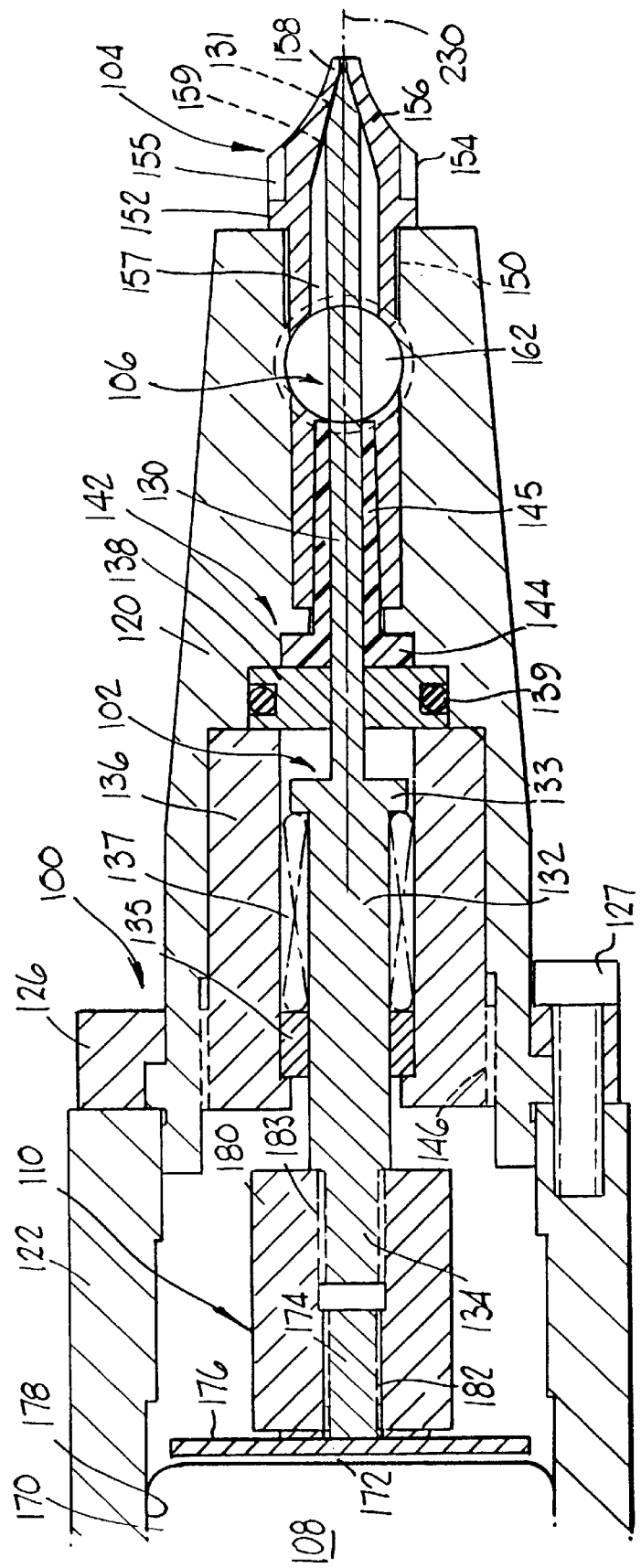
Figure 6:
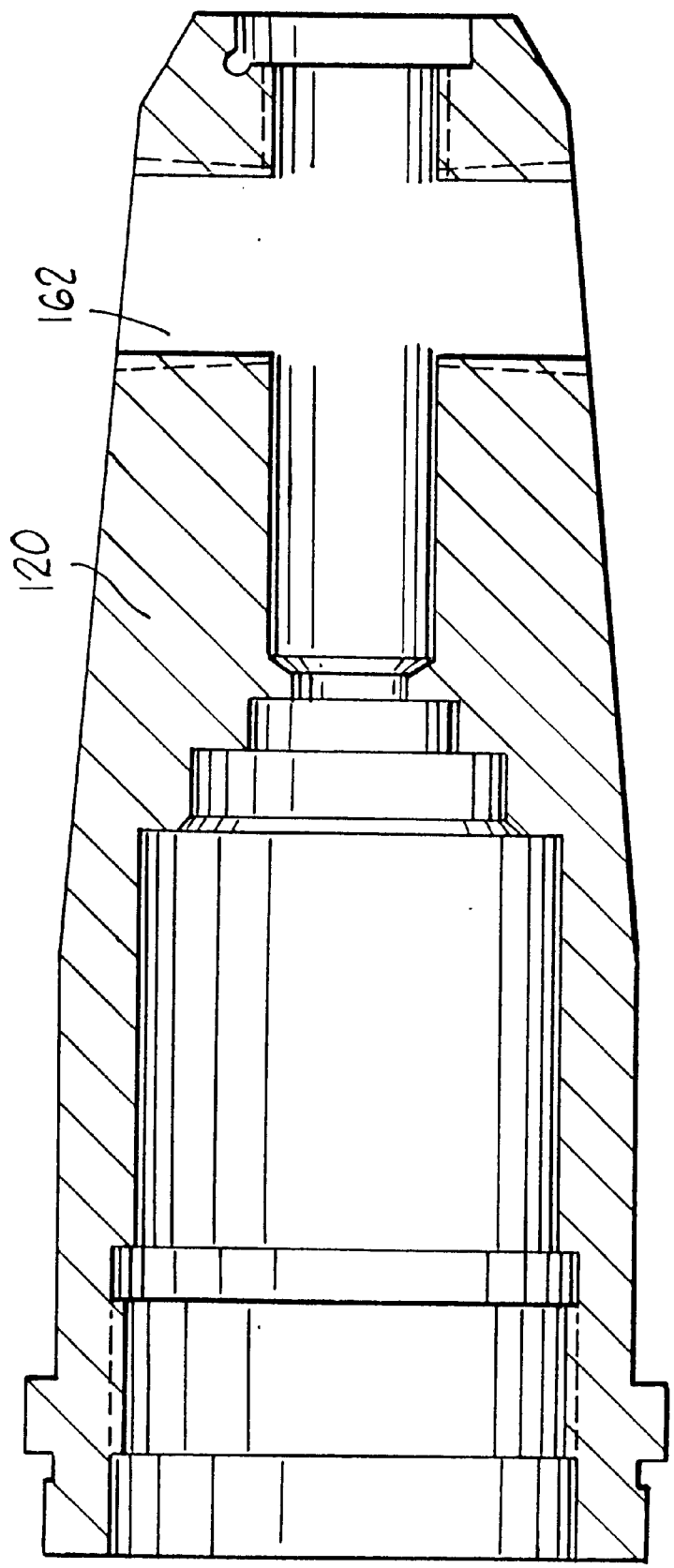
FIG. 6 is a cross-sectional side elevational view of the lower housing portion.
Figure 7:
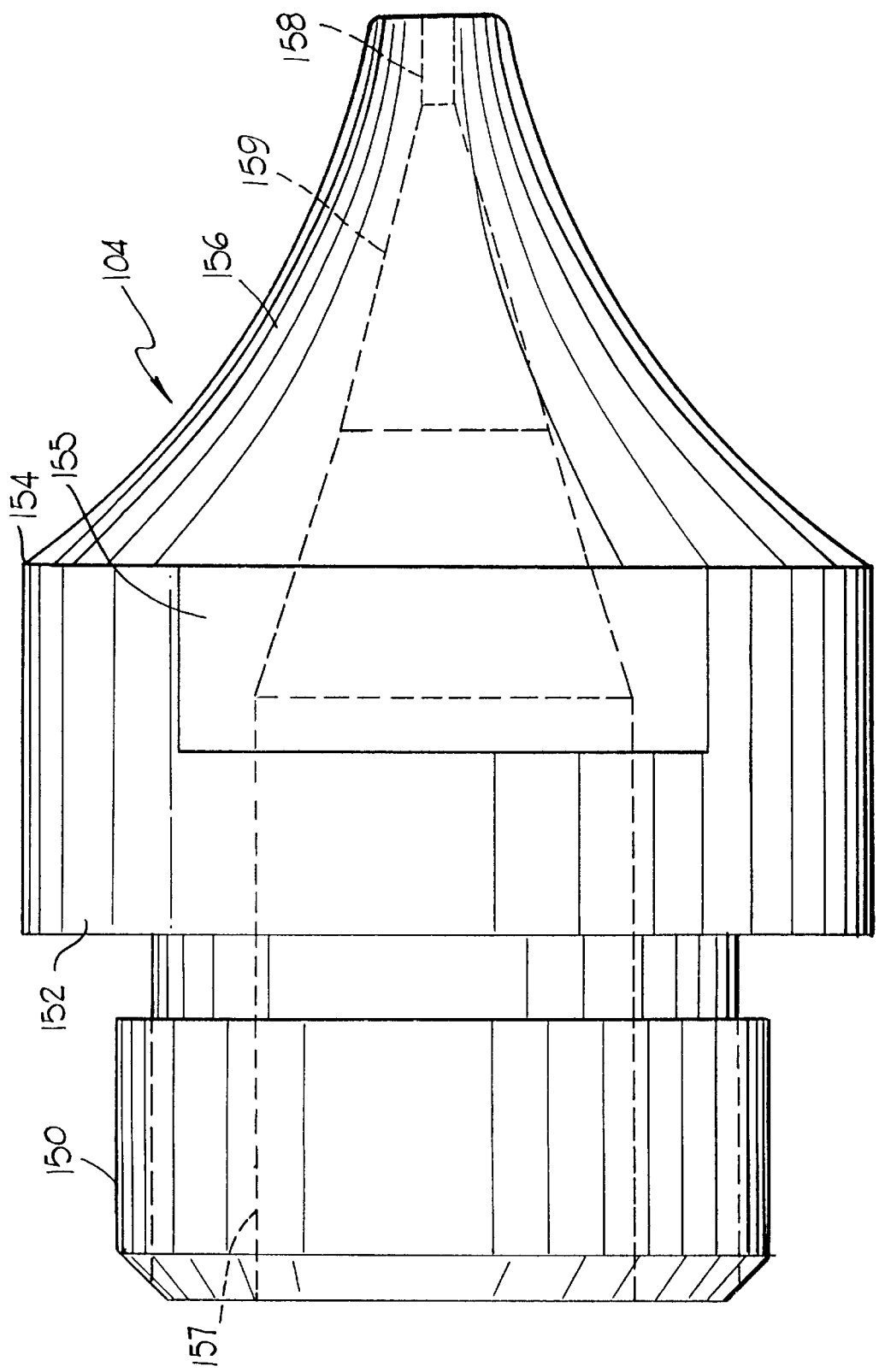
FIG. 7 is a side elevational view of the nozzle.
Figure 9:
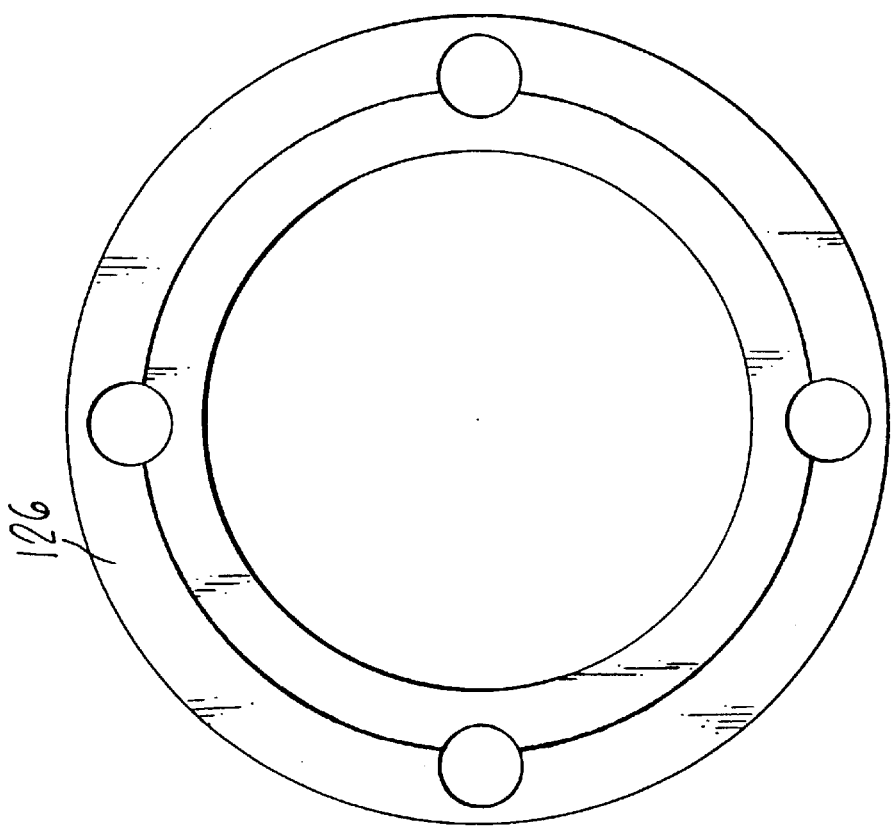
FIG. 9 is an end view of the clamp ring.
Figure 8:
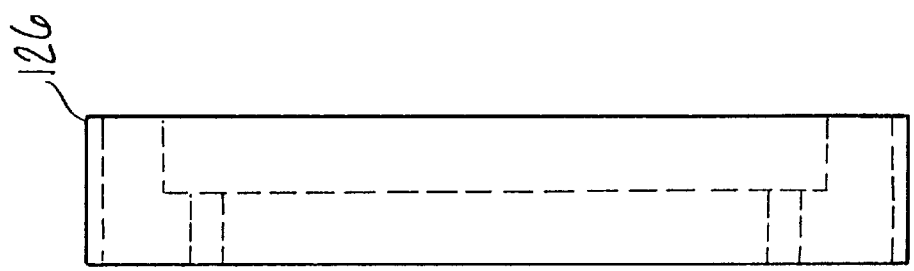
FIG. 8 is a side elevational view of the clamp ring.
Figure 10:
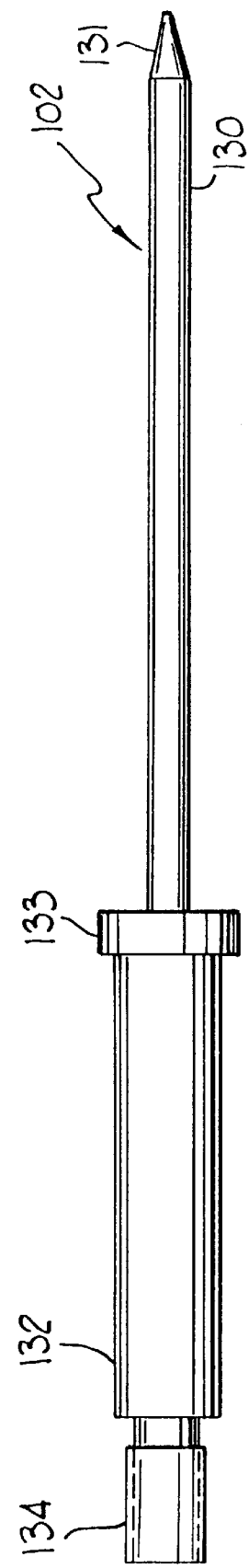
FIG. 10 is a side elevational view of the needle valve member.
Figure 11:
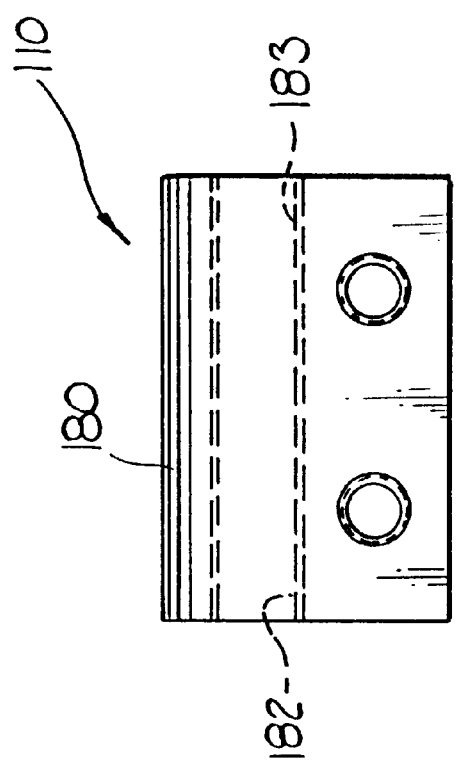
FIG. 11 is a side elevational view of the needle valve-actuating solenoid coupling member.
Figure 11A:
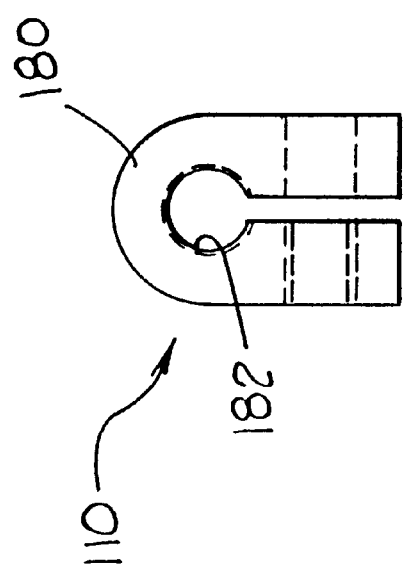
FIG. 11A is an end view of the needle valve-actuating solenoid connecting member.
Figure 12:
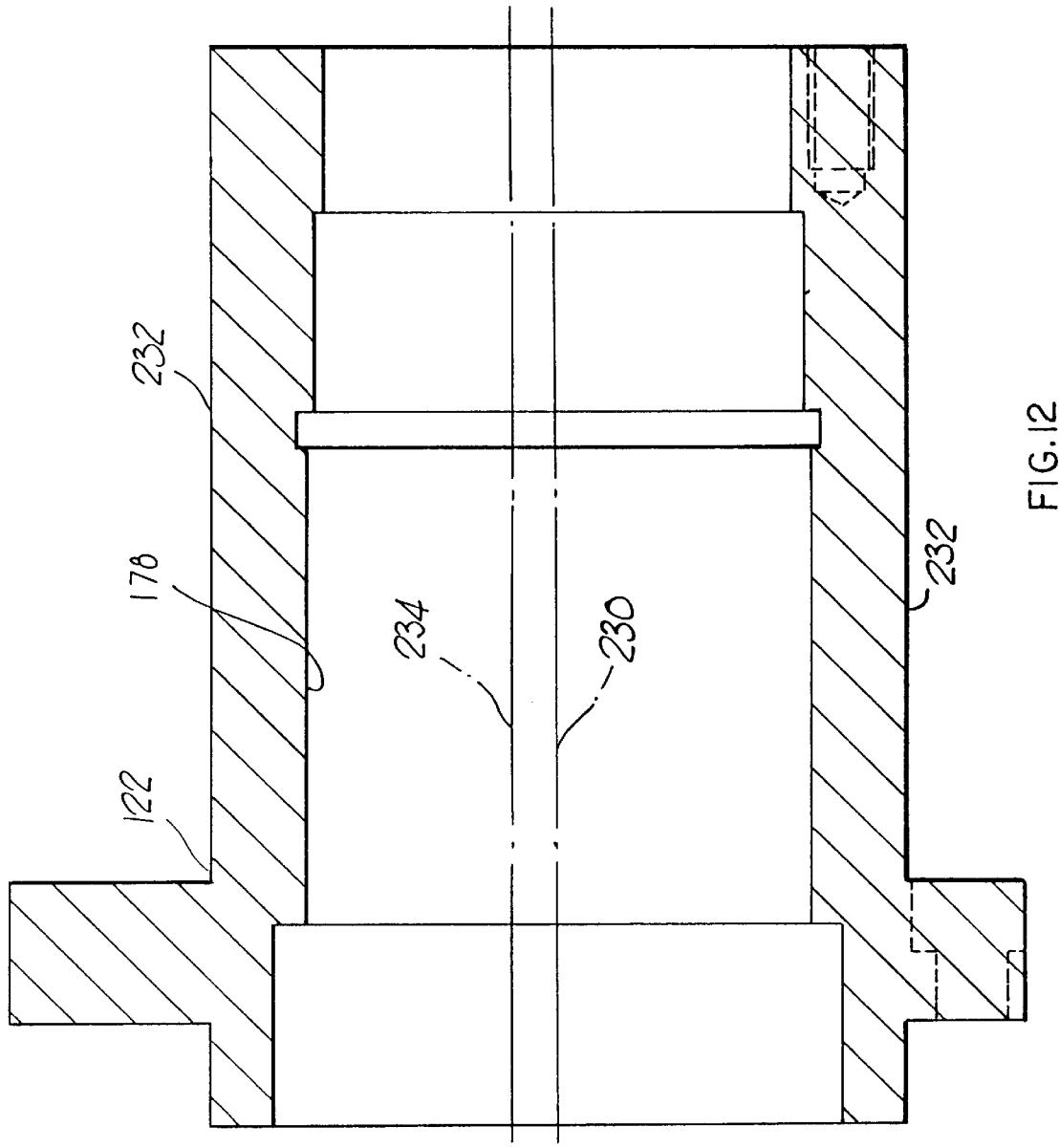
FIG. 12 is a cross-sectional side elevational view of the intermediate housing portion.
Figure 12A:
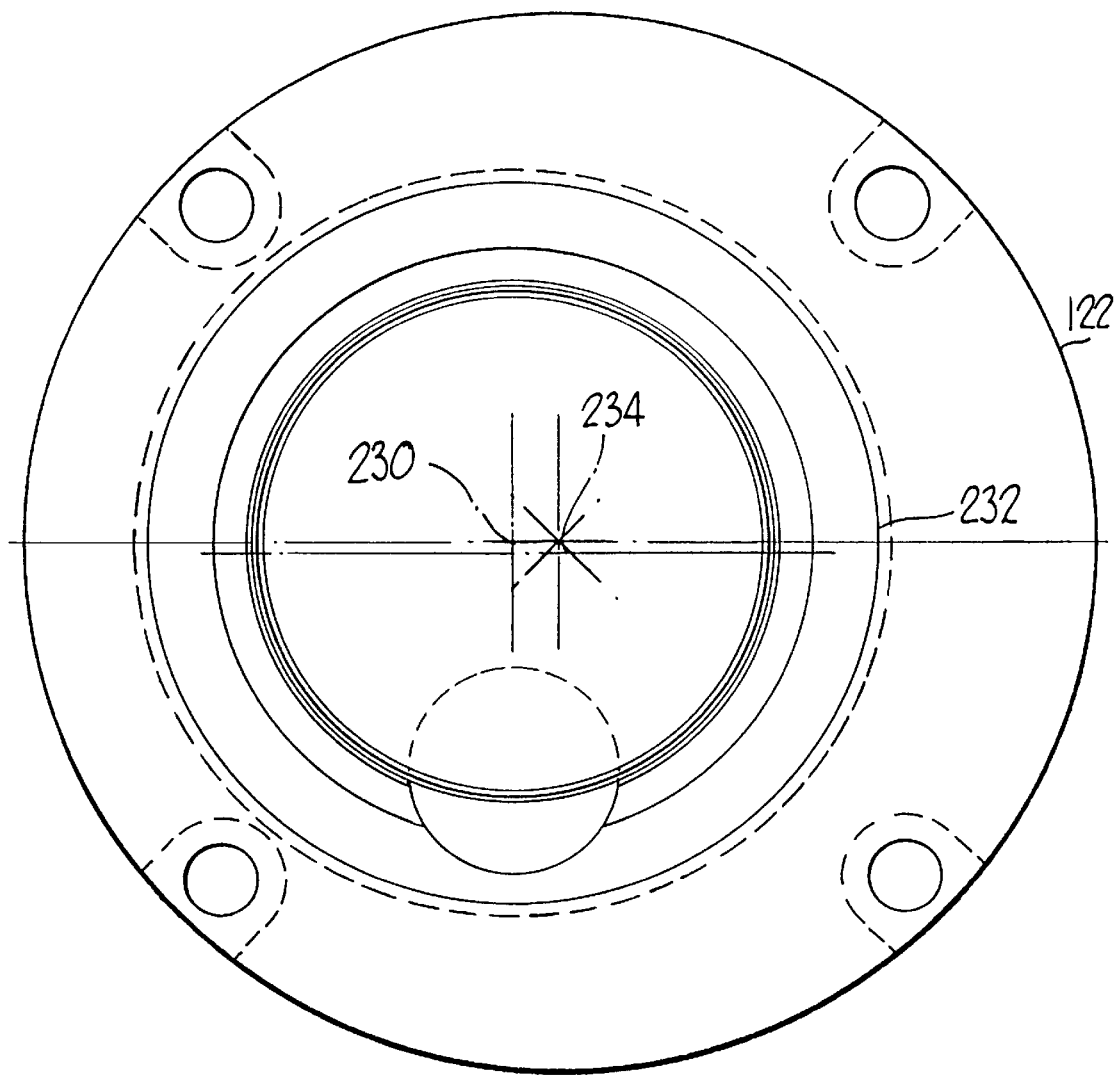
FIG. 12A is an upper end view of the intermediate housing portion.
Figure 12B:
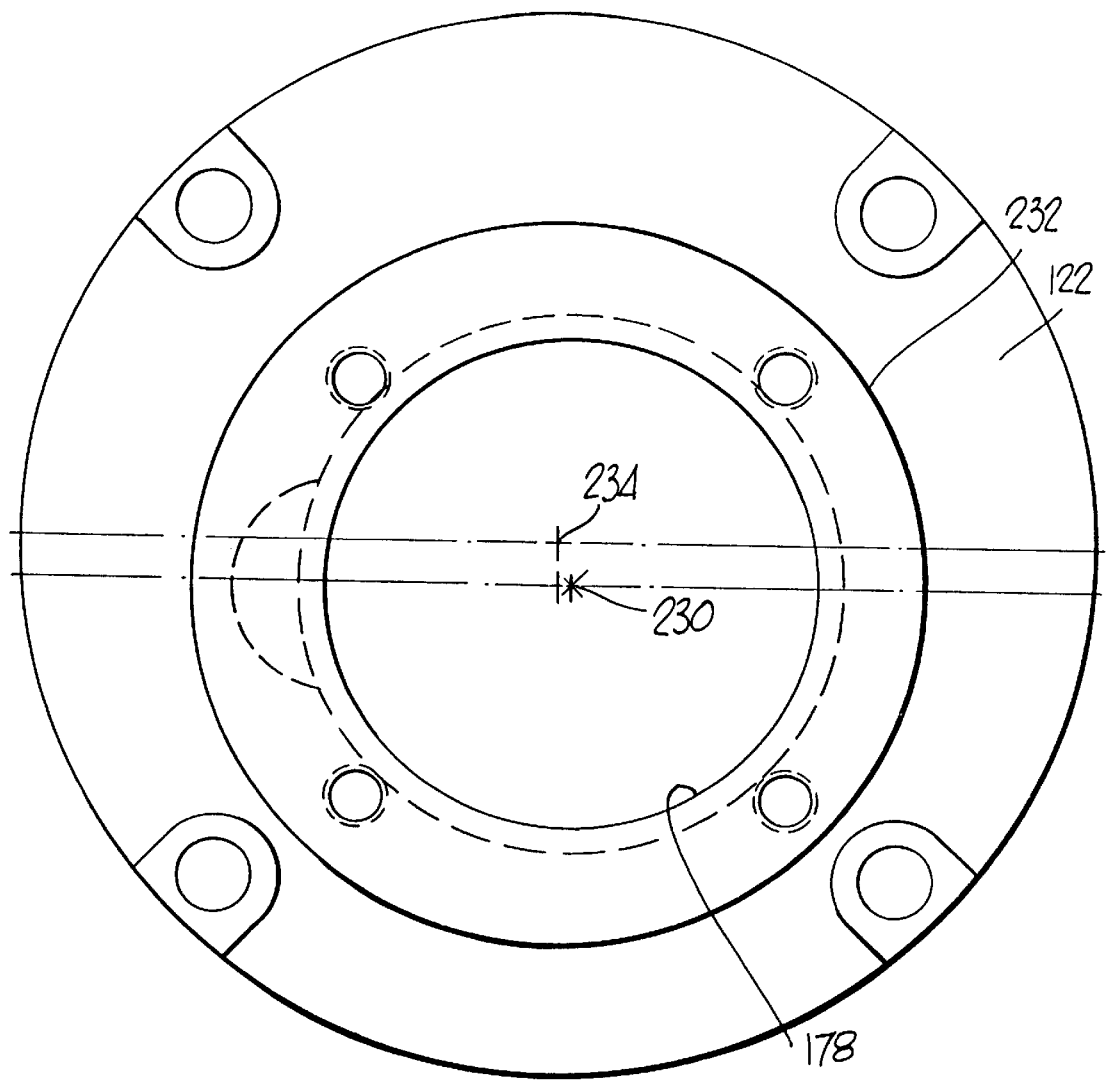
FIG. 12B is a lower end view of the intermediate housing portion.
Figure 15:
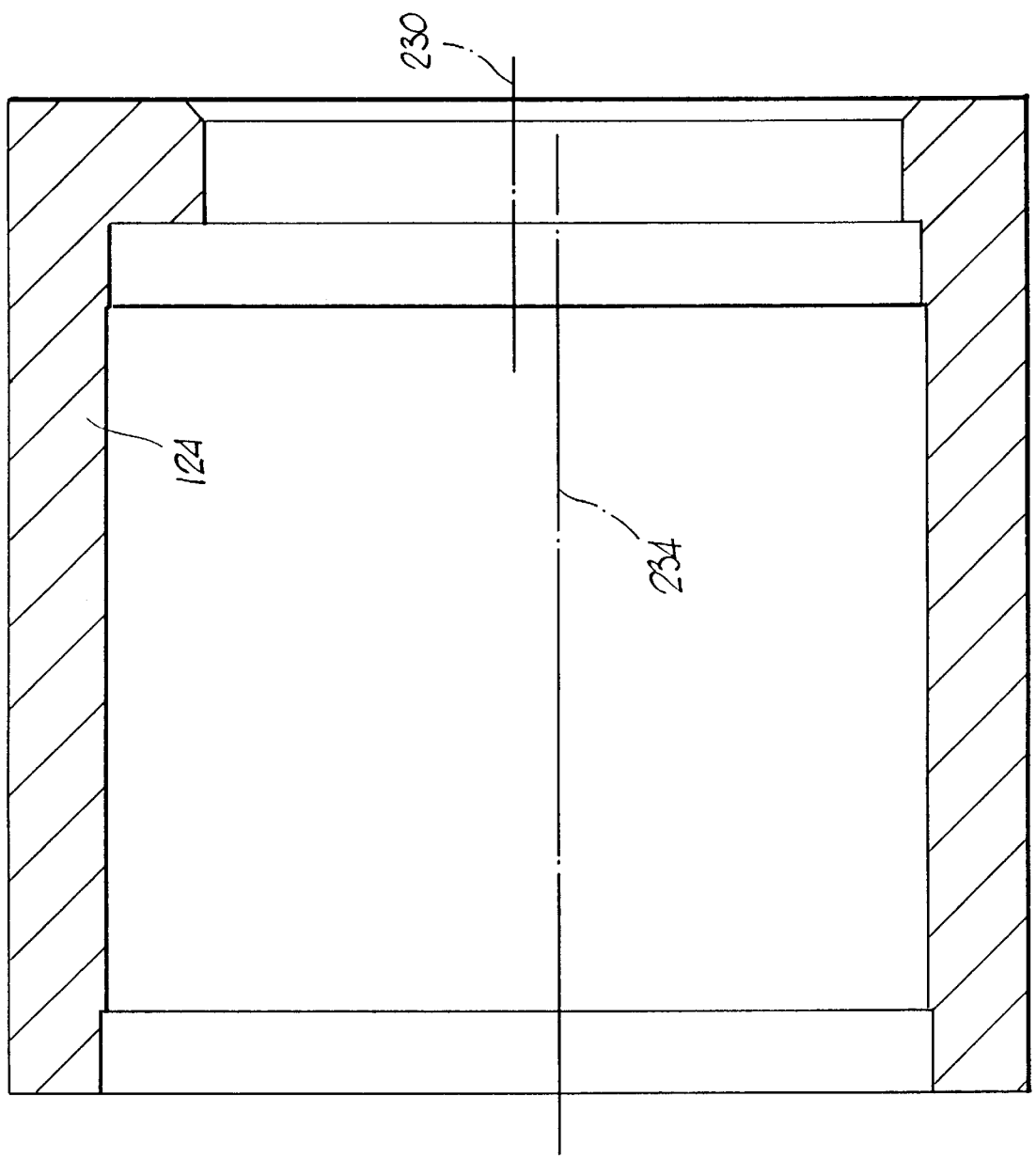
FIG. 15 is a cross-sectional side elevational view of the upper housing portion.
Figure 15A:
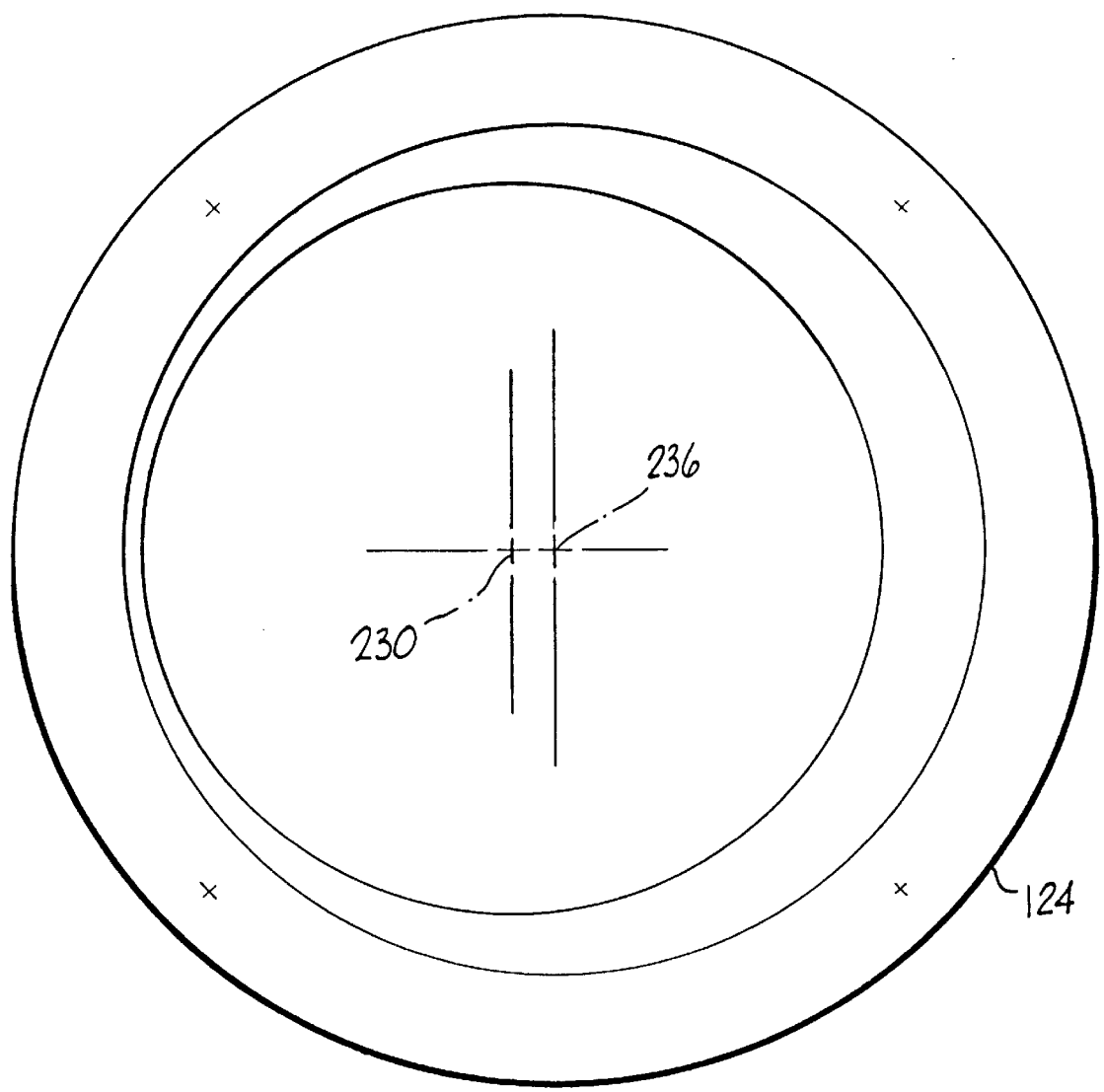
FIG. 15A is an upper end view of the upper housing portion.
Figure 15:
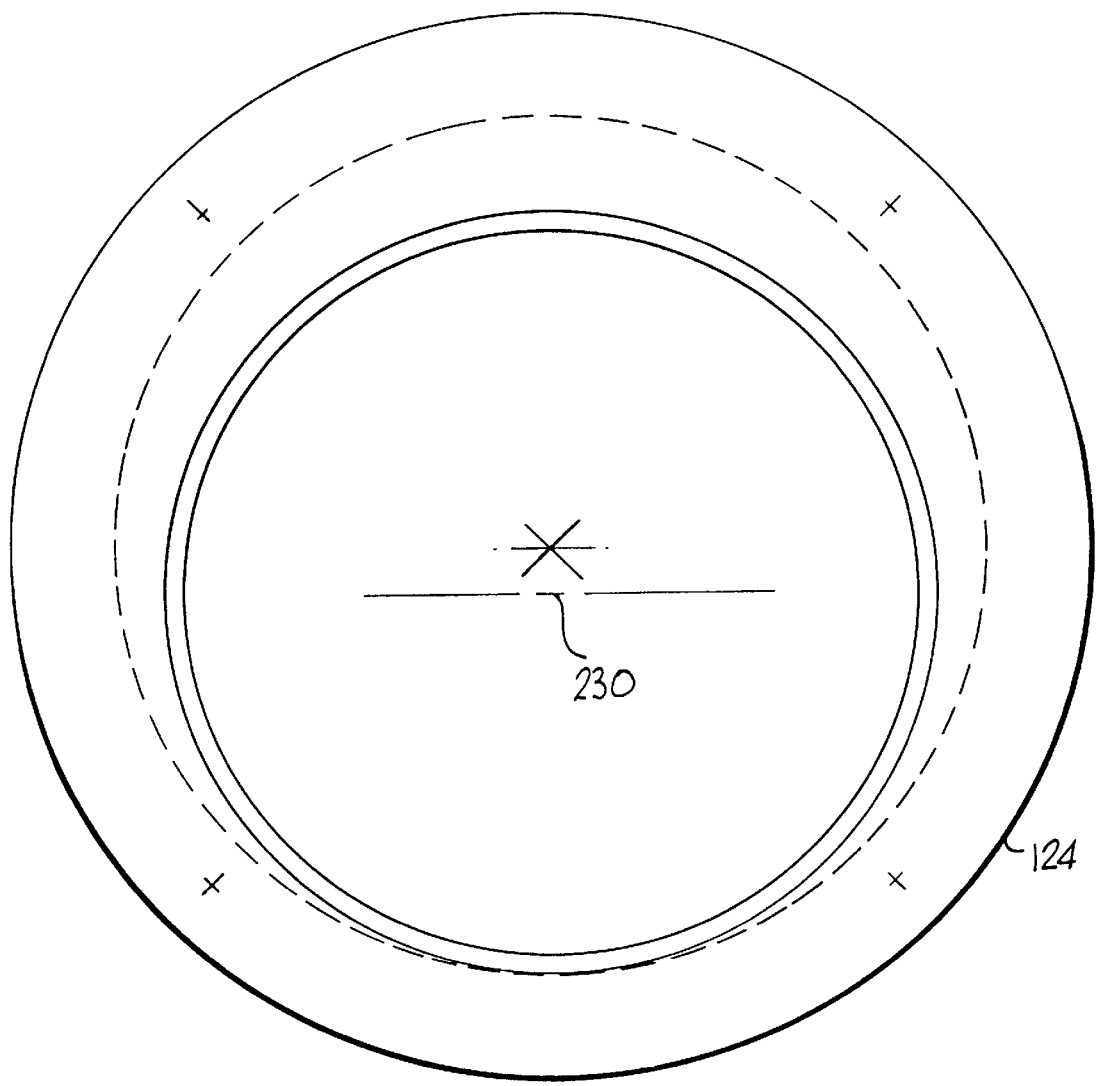
Figure 16:
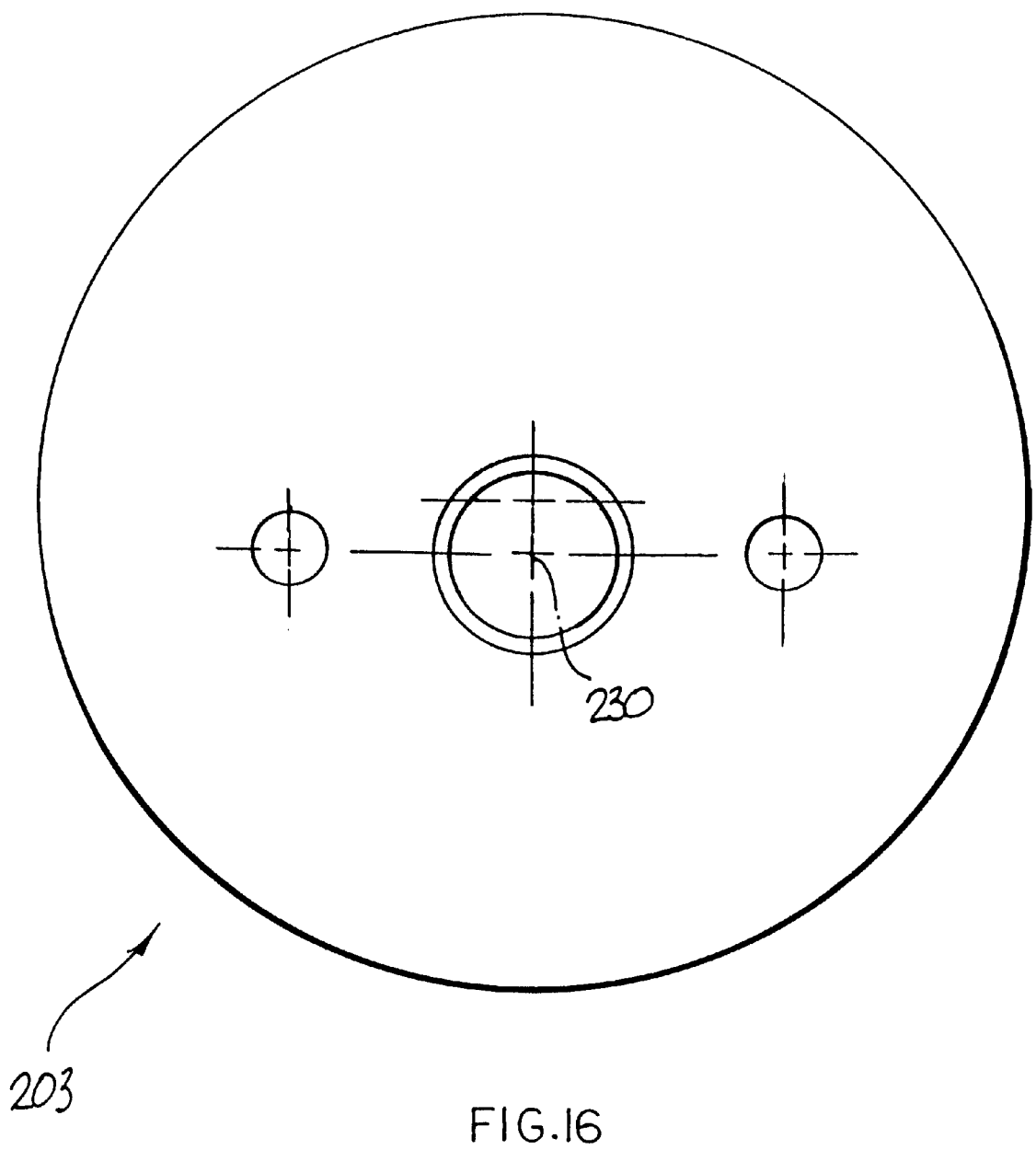
FIG. 16 is an end view of the lower mounting plate member.
Figure 17:
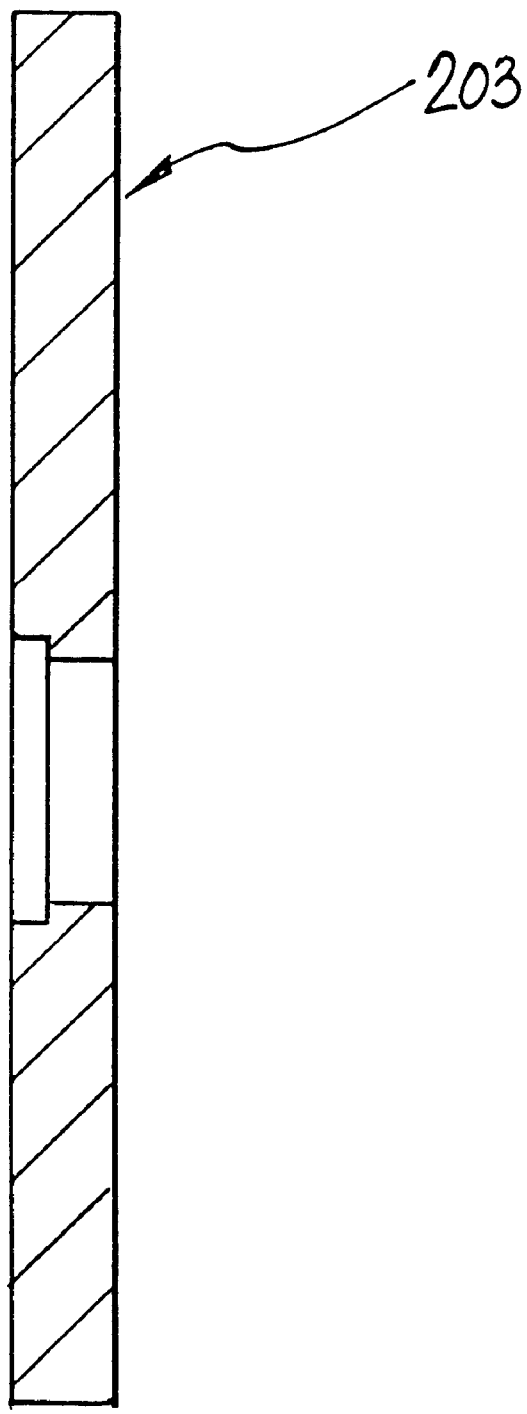
FIG. 17 is a cross-sectional view of the mounting plate member of FIG. 16.
Figure 18:
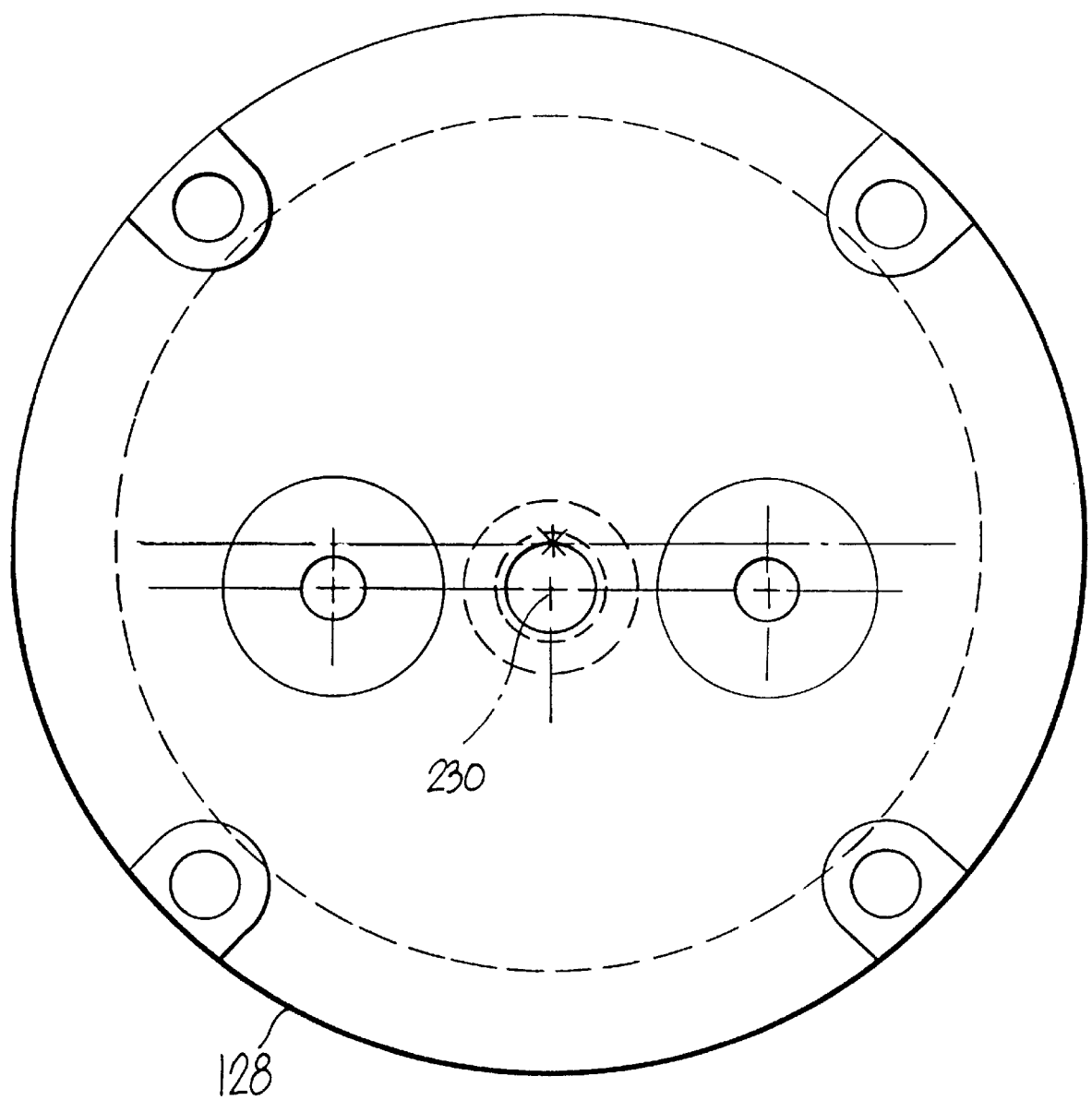
FIG. 18 is an end view of the housing end plate member.
Figure 19:
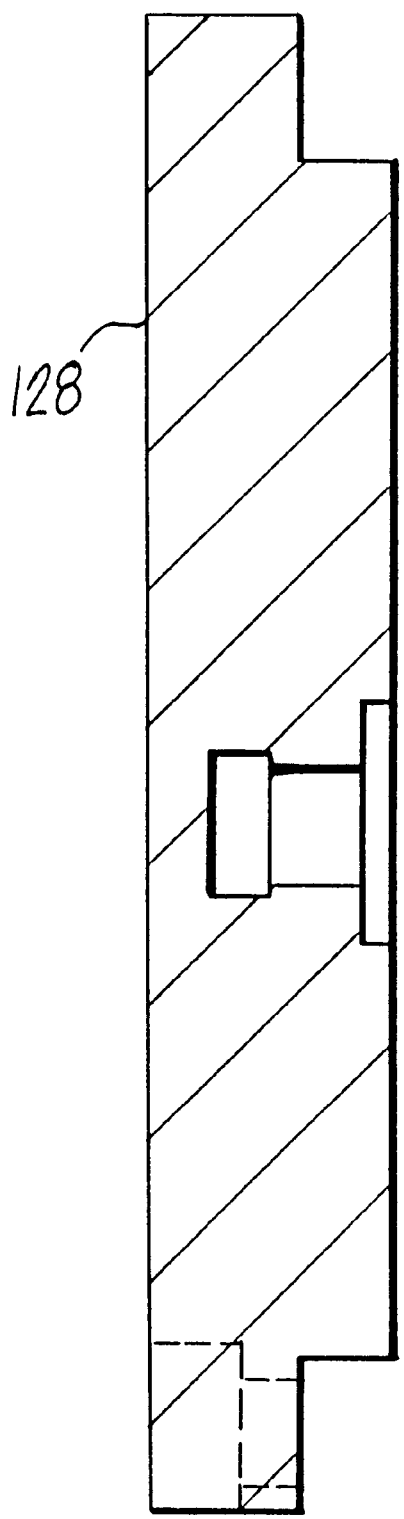
FIG. 19 is a cross-sectional view of the housing end plate member.

As shown in FIGS. 5A & 5B, the electronically actuated and adjustable nozzle system of the present invention comprises a housing means 100, a flow control needle means 102, a sealant dispensing nozzle means 104, a sealant supply chamber means 106, a variably axially adjustable needle actuating solenoid means 108, a lower coupling means 110 for connecting the solenoid means 108 to the flow control needle means 102, sealant flow gap adjustment solenoid means 112, 114, and an upper coupling means 116 for connecting the needle actuator solenoid means 108 to the flow gap adjustment solenoid means 112, 114.

Housing means 100 comprises a lowermost relatively small diameter generally cylindrical needle/nozzle support housing portion 120, an intermediate needle actuating solenoid support housing portion 122, and an uppermost relatively large diameter gap adjustment solenoid support housing portion 124 which are stacked one upon another and suitably fixedly connected by suitable connecting means such as a ring member 126, and associated threaded fastener members 127 and an end plate member 128 and associated threaded fastener members 129.

Needle means 102 comprises a lowermost relatively small diameter portion 130 terminating in a conical lower end portion 131 and an intermediate relatively large diameter portion 132 connected to portion 130 by abutment flange portion 133 and terminating in an upper threaded connecting portion 134. Intermediate needle portion 132 is separably supported by an upper bushing bearing means 135 mounted in a sleeve member 135. A compression spring means 137 is mounted between upper bearing means 135 and needle flange portion 133 to bias the needle member to the closed position. Lower needle portion 131 extends through a guide bore in an abutment plate member 138 having an O-ring peripheral seal member 139 and resilient rubber polymer sealing means 142 comprising a flanged upper end portion 144 and an elongated tapered lower end portion 145. Sleeve member 136 (FIG. 5B) is threadably connected to lower housing portion 120 by a threaded portion 146.

Nozzle means 104 comprises a threaded upper coupling portion 150, an abutment flange portion 152 and a lowermost head portion 154 having wrench slots 155 and an inwardly tapered end portion 156. A relatively large diameter central sealant flow passage 157 is connected to a relatively small diameter cylindrical dispensing end passage portion 158 by a conical portion 159 which provides a needle seat. Passage 157 intersects an enlarged cylindrical sealant supply chamber 106 connected to supply and return cross passage means 162 which are suitably connected to sealant supply and return hose means (not shown) as previously described.

Needle actuator solenoid means 108 is provided by a generally conventional low-profile low voltage D.C. operated push or pull solenoid device as shown and described on pages LP 1–4 of the catalog of Lucas Ledex, Inc. of Vandalia, Ohio, the disclosure of which is incorporated herein by reference. In general, the solenoid means comprises a cylindrical housing member 170 which holds a fixed magnetic pole hub member surrounded by a coil member (not shown), and an axially displaceable magnetic pole movable hub member fixedly mounted on a shaft member 172 having opposite end portions 173, 174. The shaft member 172 is slidably supported in the fixed hub member. An annular flux plate member 176 is fixedly mounted on the movable hub member to provide an auxiliary flux path. In operation, the movable hub member, armature shaft 172 and flux plate member 176 are reciprocably axially movable as a unit relative to the coil, fixed pole hub piece and housing. In the present invention, the amount of axial movement is preferably between 0.040 and 0.048 inch. In the present invention, lower shaft end portion 174 is provided with threads and is threadably connected to the lower coupling means 110 and thus, operably connected to the needle member. The outer cylindrical side surface of solenoid housing member 170 is axially slidably adjustably mounted in and supported by a cylindrical inner surface 178 of the intermediate support housing portion 122. The upper end of the solenoid housing member is connected to and fixedly mounted on the upper coupling means 116 by suitable fastening means.

The lower coupling means 110 comprises a split coupling member 180 having coaxial threaded bore portions 182, 183 for receiving threaded solenoid shaft end portion 174 and threaded needle end portion 134. The construction and arrangement is such that energization of solenoid 108 causes axial upward movement of solenoid armature shaft 172 and corresponding axial upward movement of needle member 102 against the bias of spring 137 to move the needle off the nozzle needle seat a predetermined distance equal to the stroke of the solenoid armature shaft.

The upper coupling means 116 comprises a coupling member 190 having an annular hub portion 192 and an annular flange portion 194 with a central bore 195 to slidably receive the upper end portion 173 of the solenoid shaft 172. One end 194a of flange portion 194 is elongated to provide a key portion to engage a slot in housing portion 122 and prevent rotation of solenoid housing 108. Hub portion 192 has a threaded bore 196 (FIG. 14) for receiving a threaded end portion 198 of a rotatable coupling shaft member 200 (FIG. 14A). The upper end portion 202 of coupling shaft member 200 is rotatably supported by and mounted in a support plate member 203. A threaded nut 204 (FIG. 5A) is fixedly mounted in a central bore 206 of shaft member 216 and threadably connected to a threaded lower end portion 206 of the reversely rotatable drive shaft of the lowermost gap adjustment solenoid unit 114 as hereinafter described. The construction and arrangement is such that rotation of solenoid drive shaft causes rotation of the coupling shaft and axial up or down displacement of the coupling member 190 and the needle actuating solenoid mounted thereon.

Each of the adjustment solenoid means 112, 114 is provided by a generally conventional unidirectional low voltage direct current stepping solenoid as shown and described on pages SS1–6 of the catalog of Lucas Ledex Inc. of Vandalia, Ohio (copy enclosed herewith), the disclosure of which is incorporated herein by reference. Each stepping solenoid comprises a cylindrical housing member 210, 212 surrounding and supporting the operational apparatus which includes a coil, an armature plate, an armature hub, a spring cage, return springs, a detent plate, an output half, detent springs, a detent rotor, a retaining rig, and an end cap all as described in the Lucas Ledex, Inc. catalog incorporated herein by reference.

The stepping solenoids are reversely unidirectional so that separate energization of one solenoid causes rotation in one direction and separate energization of the other solenoid causes rotation in the opposite direction. In the presently preferred embodiment, each stepping solenoid is operable through thirty-six positions in ten step increments during each revolution. The stepping solenoids 112, 114 are connected by a central connecting plate 214 and mounted on end plate members 218 and 203. Upper half end portion 218 is received in and rotatably supported by a bore 219 in upper end plate member 128.

The present invention provides eccentric nozzle location adjustment means whereby the central axis 230 of the nozzle discharge passage 158 may be moved along an arc relative to the container lid member. The outer cylindrical surface 232 of intermediate housing portion 122 has a central axis 234 which is eccentrically offset relative to central axis 230. Upper housing portion 124 also has a central axis 236 which is offset relative to central axis 230. Housing portion 122 is rotatably supported in a cylindrical bore in a releasable clamp member (not shown) so as to be rotatable therein to vary the location of the nozzle.

What is claimed is:

1. A method of opening and closing a needle valve of a sealant material dispensing nozzle unit to provide a predetermined sealant material flow gap causing a predetermined amount of sealant material to be dispensed during a predetermined dispensing time period; and of selectively varying the size of the flow gap and the amount of sealant material dispensed during a predetermined time period; and comprising:

operatively connecting the needle valve to an electrically operable rotary solenoid means and selectively adjusting the amount of opening movement of the needle valve and thereby adjusting the size of the flow gap by selectively energizing and rotating said rotary solenoid means; and operatively connecting the needle valve to an electrically operable reciprocable solenoid means and causing gap opening and closing reciprocable axial movement of the needle valve by energizing and de-energizing said reciprocable solenoid means.

2. A method of applying sealant to can lid members with a sealant applying mechanism wherein said method comprises:

opening a needle valve located within said sealant applying mechanism a first distance in accordance with a first setting of an adjustment mechanism located within said sealant applying mechanism by energizing an electrically operable reciprocable solenoid;

applying to a can lid member a first quantity of sealant dictated by said first distance;

adjusting said adjustment mechanism from said first setting to a second setting by energizing an electrically operable rotary solenoid;

opening said needle valve a second distance in accordance with said second setting of said adjustment mechanism by energizing said electrically operable reciprocable solenoid; and applying to a can lid member a second quantity of sealant dictated by said second distance.

3. The method of claim 2 wherein said sealant applying mechanism is mounted on a rotatable carriage.

4. The method of claim 3 wherein said adjusting is carried out while said rotatable carriage is rotating.

5. The method of claim 2 wherein said adjusting includes rotating a threaded member which is operatively connected to said electrically operable rotary solenoid.

* * * * *

UNITED STATES PATENT AND TRADEMARK OFFICE
CERTIFICATE OF CORRECTION

PATENT NO. : 5,945,160
DATED : August 31, 1999
INVENTOR(S) : Kobak, et. al.

It is certified that error appears in the above-identified patent and that said Letters Patent is hereby corrected as shown below:

Column 6, (line 10), delete "135" and insert therefor --136--.
Column 7, (line 18), delete "206" and insert therefor --220--.
Column 7, (line 18), after "drive shaft" insert --216--.
Column 7, (line 46), delete "218 and 203" and insert therefor --128, 203--.

Signed and Sealed this

Seventh Day of March, 2000

Attest:

Q. TODD DICKINSON

Attesting Officer

Commissioner of Patents and Trademarks